United States Patent

[11] 3,555,968

| | | | | |
|---|---|---|---|---|
| [72] | Inventor | Pierre A. Praddaude<br>Crepy-en-Valois, France | | |
| [21] | Appl. No. | 817,106 | | |
| [22] | Filed | Apr. 17, 1969 | | |
| [45] | Patented | Jan. 19, 1971 | | |
| [73] | Assignee | Societe Anonyme Poclain Le Plessis-<br>Belleville<br>Oise, France<br>a company of France | | |
| [32] | Priority | Apr. 19, 1968 | | |
| [33] | | France | | |
| [31] | | No. 148,738 | | |

[54] HYDRAULIC POWER TRANSMISSION
2 Claims, 1 Drawing Fig.

[52] U.S. Cl. ............................................ 91/412,
60/53
[51] Int. Cl. ...................................................F15b 11/16,
F15b 13/09
[50] Field of Search.......................................... 60/52H.E.,
53, 97E, 53A; 91/412, 420, 442; 180/(Inquired),
6.48, 66P

[56] References Cited
UNITED STATES PATENTS

| | | | |
|---|---|---|---|
| 2,215,169 | 9/1940 | Beeston........................ | 60/97E |
| 2,446,242 | 8/1948 | Orshansky.................... | 180/6.48 |
| 3,091,930 | 6/1963 | Thoma et al.................. | |

Primary Examiner—Edgar W. Geoghegan
Attorney—Mason, Fenwick & Lawrence

ABSTRACT: An hydraulic power transmission for a vehicle, such as is used in the building and civil engineering industries, comprises two sets of receivers each supplied by a pump, wherein a speed limiter is disposed in the common return line of the receiver circuits and is piloted, via a shuttle valve, by whichever is the higher of the pump delivery pressures, whereby the receiver set temporarily being supplied on reduced delivery is free to be driven whereas the two receiver sets can, if need be, have their movements braked. This arrangement enables the same pumps which supply the wheel driving motors of the vehicle, to also drive an actuator without the disturbing consequence which has been prevalent hitherto, of one of the receiver sets braking the other.

PATENTED JAN 19 1971
3,555,968
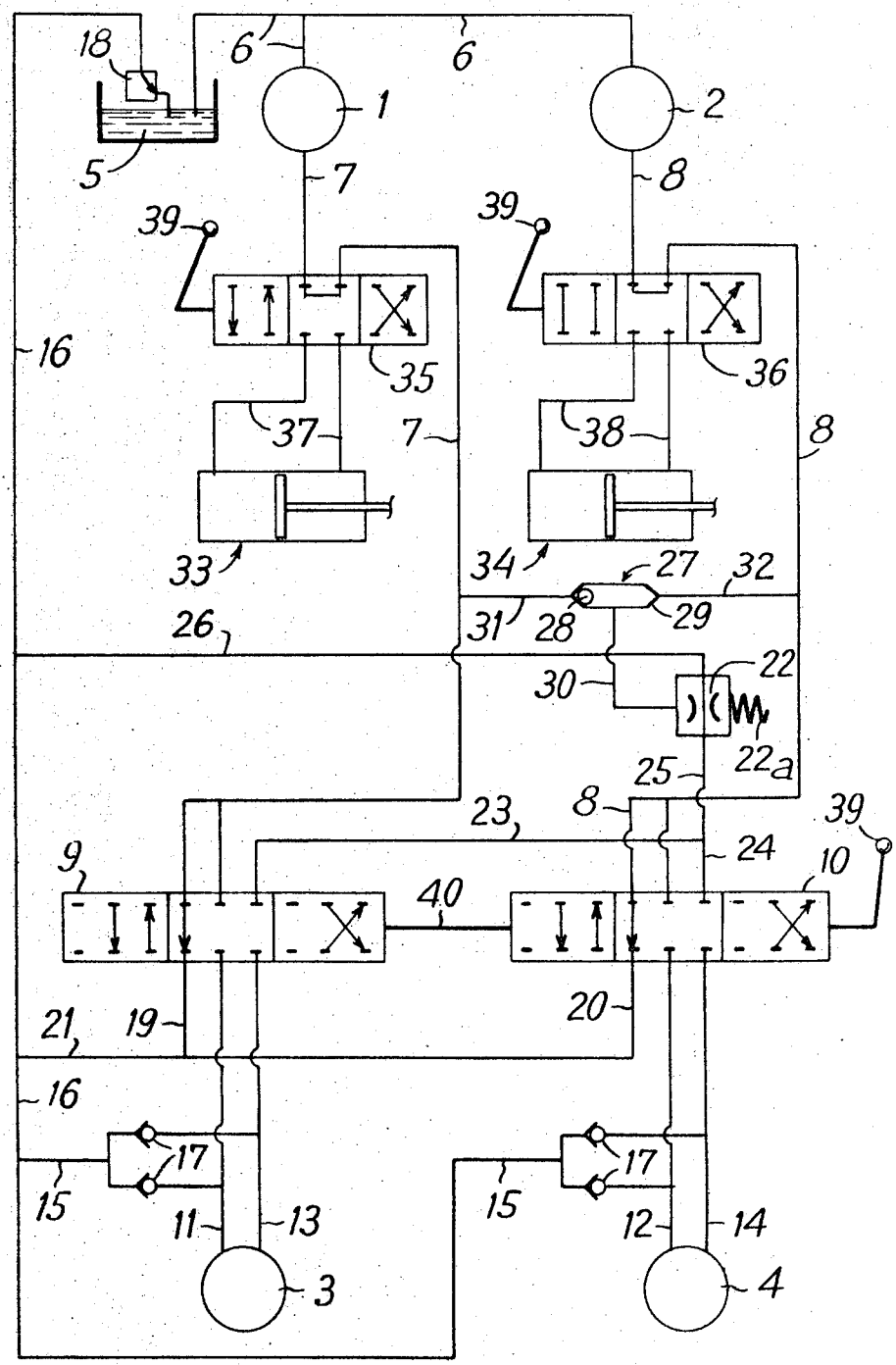
INVENTOR
PIERRE A. PRADDAUDE
BY
Mason, Fenwick & Lawrence
ATTORNEYS

HYDRAULIC POWER TRANSMISSION

This invention is for improvements in or relating to hydraulic transmissions.

In the hydraulic power transmission art, circuits are known which comprise two groups of receivers, such as the hydraulic motors driving the wheels of a vehicle, the receivers of any one set being energized by a pump. It might sometimes be convenient, since there are two supply pumps, to be able to operate a receiver other than any of the receivers in the two sets just mentioned; unfortunately, it is at present impossible to supply any such independent receiver. This case occurs more particularly when the same pumps which supply the wheel-driving motors are required to supply an actuator as well, for even if the actuator is supplied in series with the motor set associated with the particular pump concerned, the presence of the actuator rod, the effect of which is that the quantities of fluid injected on one side of the actuator piston and delivered from the opposite side thereof differ from one another, means that energization of the extra receiver unbalances the originally balanced supplies to the two sets of receivers. Consequently, one receiver set brakes the other, a feature which is very disturbing, inter alia in the case of vehicle-driving motors.

It is an object of this invention to obviate these disadvantages; to this end the invention provides a transmission wherein the receiver set temporarily being supplied on reduced delivery is free to be driven whereas the two receiver sets can, if need be, have their movements braked.

The invention therefore relates to a hydraulic power transmission which is of use in a vehicle, inter alia building and civil engineering equipment, and which comprises two sets of receivers each supplied by a pump, wherein a speed limiter is disposed in the common return line of the receiver circuits and is piloted, via a shuttle valve, by whichever is the higher of the pump delivery pressures. Advantageously, the shuttle valve comprises a ball which is disposed in a casing and on which the delivery pressures of the two pumps act through two lines connecting the delivery sides of the pumps to the two inlets of the shuttle valve.

The invention and its secondary features and their advantages will be more clearly understood from the following exemplary description of an embodiment.

The invention is shown applied to the hydraulic power transmission of vehicle-driving motors, with provision for supplying an extra receiver, for instance, an actuator.

The description and drawing are of course purely explanatory and not limitative.

Reference will now be made to the accompanying drawing, the single FIG. of which is a diagrammatic view of a transmission according to the invention.

Referring to the drawing, a hydraulic power transmission is adapted to be energized by pumps 1 and 2 associated with respective receiver sets 3, 4. In the event, each set 3, 4 takes the form of hydraulic motors driving the wheels of a vehicle. As will be readily apparent, the invention is also of use for driving the caterpillars of a caterpillar vehicle or for driving receivers other than motors.

The pumps 1, 2 are connected through intake lines 6 to a fluid sump 5. Extending from pumps 1, 2 are lines 7, 8 which go to three-position distributors 9, 10. Two lines 11, 13 connect the intake and delivery sides of motor set 3 to distributor 9; similarly, two lines 12, 14 connect the intake and delivery sides of motor set 4 to distributor 10. Lines 15 connect lines 11—14 to a line 16 extending to a sump 5, with the interposition of ball valves 17 which allow the fluid to flow only in the direction corresponding to a possible extra filling of the lines 11—14 by fluid from the lines 15, 16. Actually, line 16 is a general fluid return line to sump 5 and joins the same by way of a discharge valve 18. Two lines 19, 20 disposed downstream of distributors 9, 10 connect the same to a line 21 extending to line 16. When distributors 9, 10 are in the neutral position, which is the position corresponding to nonenergization of motors 3, 4, lines 7, 8 are connected to lines 19, 20 which, via lines 16, 21, form a return to sump 5.

Disposed upstream of distributors 9, 10 is a speed limiter 22 which is connected to such distributors through lines 23, 24 disposed in registration with lines 13, 14, the lines 23, 24 actually extending to speed limiter 22 via a common line 25 which is extended beyond limiter 22 by a line 26 going to line 16.

Also, a line 30 connects a shuttle valve 27, in the form of a ball 28 received in a casing 29, to speed limiter 22, and lines 31, 32 connect valve 27 to the pump delivery lines 7, 8. Limiter 22 has a movable constriction whose position is adjusted by the resultant of two opposing forces - the pressure of the fluid in line 30, and the force of a spring 22a.

An extra receiver or receiver set can be energized by pump 1, and pump 2 can too if required energize another receiver. In the transmission shown, each pump is adapted to energize an extra actuator, pump 1 being adapted to energize actuator 33 and pump 2 being adapted to energize actuator 34. Three-position distributors 35, 36 disposed on lines 7, 8 and connected to actuators 33, 34 via lines 37, 38 enable the actuators 33, 34 to be selectively energized to either hand or not to be energized.

The sliding valve spools of the various distributors can be operated by known means, for instance, manually through the agency of levers 39. So far as driving the wheels of a vehicle is concerned, the transmission shown must of course be devised to drive such wheels to the same hand, and to this end the two sliding valve spools are interconnected, for instance, by a rod 40, so that they can be simultaneously positioned in compatible positions.

The transmission described provides a satisfactory solution to the problem of supplying an extra receiver, such as an actuator 33 or 34, without disturbing the operation of the two receiver sets 3, 4.

Considering first operation when the distributors 9, 10, 35, 36 are positioned as shown, the pump 1 sucks fluid into sump 5 through line 6 and delivers fluid to lines 7, 19, the fluid returning to sump 5 through lines 21, 16. The distributors 9, 35 are in the neutral position and so direct the fluid neither to the motor set 3 nor to the extra receiver—in this case the actuator 33. Similar considerations apply to the second part of the transmission formed by the pump 2, motor set 4, actuator 34 and distributors 10, 36.

When the distributors are in their second position, the only difference from what has just been described concerns the distributors 9, 10, whose sliding valve spools are moved to the right so as to establish communication between the lines 7, 11 and 8, 12. The pumps 1, 2 are initially chosen to have deliveries providing combined drives of the motor sets 3, 4 such that there is a balanced drive of the vehicle with the wheels associated with the sets 3, 4 running at equal linear speeds. Consequently, and because too of the position of the distributors, the fluid pressures in the inlet lines 7, 8 are usually substantially equal.

When the vehicle moves over flat or rising ground, the motors 3, 4 actually operate as motors, and so the fluid pressure in at least one of the two lines 7, 8 is high. The fluid at whichever is the higher of the pressures in the lines 7, 8 acts via lines 31 or 32 on shuttle valve 27 to thrust ball 28 thereof towards the other line 32 or 31, the fluid then going from shuttle-valve casing 29 through line 30 to limiter 22. Since the pressure in line 30 is high, spring 22a is compressed and the constriction of limiter 22 is shifted so as to leave the passage between the lines 25 and 26 completely clear. Limiter 22 therefore does nothing to inhibit the delivery from either of the motors 3 or 4; this is satisfactory since the motors are not racing and are operating not as pumps but as motors.

On the other hand, when the vehicle is moving along a downwards slope, vehicle weight becomes responsible for driving the vehicle, and so the delivery of pumps 1, 2 becomes insufficient to energize the motors 3, 4. The same then operate as pumps, with the result that the pressure of the fluid in lines 7, 8 becomes low. As in the previous case, whichever fluid is at the higher pressure reaches the line 30, but in this case the pressure is less than in the previous case and the spring 22a will move the moving constriction of limiter 22 in the direction causing constriction of the passage between the lines 25 and 26. Consequently, the delivery of fluid from the motors 3, 4 in the lines 23, 24 is inhibited, and so motor speed, and therefore vehicle speed, decrease when, as has just been stated, there is a pressure decrease in the two motor inlet lines 7, 8. If the sliding valve spools of the distributors 9, 10 had been in their left-hand end positions, operation would have been exactly as described except that the motors 3, 4 would have run to the opposite hand.

Operation will now be described for the case of particular interest here wherein, for instance, in relation to the arrangement shown in the drawing, the sliding valve spool of distributor 35 is moved to the right so that pump 1 supplies that chamber of actuator 33 which is remote from the actuator rod, and wherein the sliding valve spools of distributors 9, 10 are moved to the right so as to connect line 7 to line 11 and line 8 to line 12. The quantity of fluid entering the left-hand chamber of actuator 33—i.e., the chamber remote from the actuator rod—is greater than the quantity of fluid displaced by the piston from the actuator chamber on the same side as the actuator rod, since the same takes up some of the space on the right-hand side of the actuator piston. If, as has previously been assumed, the pumps 1, 2 can drive the wheels connected to the motors 3, 4 at equal linear speeds when actuator 33 is not being energized the pumps cannot continue to provide this drive when they are supplying the actuator 33 unless some satisfactory provision for correcting the deliveries is added to the circuit, for in the absence of correction the motors 3 are undersupplied relatively to the motors 4 and therefore act as pumps and brake the vehicle.

The presence of a corrector obviates this disadvantage in the transmission described. Assuming that the vehicle is travelling over flat or rising ground and is therefore actually being driven by its motors 3 and/or 4, the fluid delivered to line 7, which is downstream of distributor 35, is less in quantity than the fluid flowing in line 8. However, according to the invention, one and/or the other of the motor supply lines 3, 4-—in this case, the lines 11, 12—can have an extra supply in that fluid from the line 16, which valve 18 maintains at some pressure, can be added to the fluid in lines 11 and 12—in this case just to line 11—by going through line 15 and ball valve 17, the latter being calibrated to a lower pressure than valve 18. Motors 3 are therefore supplied with fluid in sufficient quantity to obviate braking of the vehicle. However, only the motors 4 drive the vehicle, since the pressure fluid supply to the motors 3 is just enough to feed them but is inadequate for them to deliver any drive power.

Operation of the valve 27 which pilots the speed limiter 22 remains as previously described. In the event, since the pressure of the fluid in line 8 is high, such fluid flows through line 32, valve 27 and line 30 to limiter 22, and moves the movable constriction against the force of spring 22a, thus opening the passage between lines 25 and 26.

Descriptions could be given of other possible uses of the transmission described but no essential further information would thereby be provided.

The advantage according to the invention is that the speed of a vehicle having such a transmission can be limited by the speed limiter 22 operating only when pressures are low in the two motor inlet lines 7, 8 simultaneously, and that limiter 22 is cut out of operation when at least one of the motor sets 3 or 4 is being energized by a high pressure—i.e., when such set is actually providing drive. This operation is produced through the agency of piloting of limiter 22 by shuttle valve 27.

Another considerable advantage is that the motor set 3 or 4 which is supplied by the lines 7 or 8 associated with the supply to an extra receiver 33 or 34—i.e., which is supplied by the line in which the delivery from the distributor 35 or 36 is the lower—remains free to be driven, thanks to the extra feeding by way of the valves 17.

As will be readily apparent, the invention is also of use for supplying motor sets, and more generally receivers 3, 4 and extra receivers 33, 34, whether the receivers of a set 3, 4 are supplied in the set serially or in parallel or whatever the number of receivers of a group may be.

The invention is not limited to the foregoing description but covers all variants which can be made to it without departing from its scope.

I claim:

1. A hydraulic power transmission which is of use in a vehicle, inter alia building and civil engineering equipment, and which comprises two sets of receivers each supplied by a pump, wherein a speed limiter is disposed in the common return line of the receiver circuits and is piloted, via a shuttle valve, by whichever is the higher of the pump delivery pressures.

2. A hydraulic power transmission as set forth in claim 1, wherein the shuttle valve comprises a ball which is disposed in a casing and on which the delivery pressures of the two pumps act through two lines connecting the delivery sides of the pumps to the two inlets of the shuttle valve.